United States Patent [19]

Dupon et al.

[11] Patent Number: 5,642,610
[45] Date of Patent: Jul. 1, 1997

[54] SHAKER MEMBERS FOR GRAPE HARVESTER

[75] Inventors: Luc Camiel Dupon, Ardooie, Belgium; Jean-Paul Marcel Lucieu Martin, Le Fenouiller; Daniel Henri André Marie Le Nevé, Challans, both of France

[73] Assignee: New Holland North America, Inc., New Holland, Pa.

[21] Appl. No.: 501,693

[22] Filed: Jul. 12, 1995

[30] Foreign Application Priority Data

Jul. 12, 1994 [GB] United Kingdom ............... 9414004

[51] Int. Cl.⁶ ............................................. A01D 46/26
[52] U.S. Cl. .................................... 56/340.1; 56/330
[58] Field of Search .......................... 56/340.1, 328.1, 56/327.1, 330

[56] References Cited

U.S. PATENT DOCUMENTS

| | | | |
|---|---|---|---|
| 4,016,712 | 4/1977 | Claxton | 56/330 |
| 4,418,521 | 12/1983 | Orlando et al. | 56/330 |
| 4,769,979 | 9/1988 | Mérant | 56/330 |
| 4,771,594 | 9/1988 | Denx et al. | 56/330 |
| 5,291,726 | 3/1994 | Nairn | 56/330 |

FOREIGN PATENT DOCUMENTS 2641158  7/1990  France ........................ 56/340.1

*Primary Examiner*—Terry Lee Melius
*Attorney, Agent, or Firm*—Larry W. Miller; Frank A. Seemar; John W. Stader

[57] ABSTRACT

A machine for harvesting fruits, berries and the like, from fruit trees and bushes planted in rows, the machine comprising a straddling chassis capable of moving across a field, a shaker assembly mounted on the chassis and including at least one pair of elongated shaker members which extend generally in the longitudinal direction of the machine and which are spaced transversely from one another and situated respectively on opposite sides of the central fore-and-aft axis of the machine so as to define an active shaking zone. Each shaker member is formed by a rod of flexible material. The machine further comprises a control mechanism operatively connected to the rods to drive them synchronously with a reciprocating motion in a direction extending transversely relative to said fore-and-aft axis. Each rod comprises an internal cavity in the form of a cylindrical bore extending the full length of the rod in a manner such that the weight of the rod is reduced considerably while having only little influence on the rigidity of the rod whereby the resonance frequency of the rod is increased.

9 Claims, 4 Drawing Sheets

SHAKER MEMBERS FOR GRAPE HARVESTER

FIELD OF THE INVENTION

The present invention relates to a machine for harvesting fruits, berries and the like, from fruit trees and bushes planted in rows, and more particularly, although not exclusively, to a machine for harvesting grapes. However, the machine of the present invention equally well is capable of being used for harvesting other fruits and berries, for example black currants, gooseberries, raspberries or coffee beans.

BACKGROUND OF THE INVENTION

Most conventional grape-picking machines use practically the same principle for harvesting grapes. This principle consists of beating or shaking the vines by imparting sinusoidal or pseudo-sinusoidal motion thereto at an amplitude and at a frequency suitable for causing the grapes or the bunches of grapes to become detached. This motion is transmitted to the vine via shaker or beater members disposed in such a manner as to act either on the vinestock or stem or else on the vegetation, i.e. on the fruit-bearing portion of the vine, depending on the type and number of shaker or beater members used. The percentage of bunches and/or individual grapes which are detached from the vines depends on the number and the amplitude of the oscillations to which a given bunch of grapes is subjected. The more energetic the shaking to which a given bunch of grapes is subjected, and the more frequently it is shaken, the more likely said bunch or its individual grapes are to become detached from the vine.

The number and the amplitude of the above oscillations depend on various parameters that may be selected, in particular on the amplitude and the frequency of the drive mechanism associated with the shaker or beater members, on the length of the active shaking zone of said shaker or beater members, on the stiffness or the flexibility thereof, and on the speed at which the machine advances, together with other factors which are imposed by the vine itself, in particular the way it is trained, its shape, and the resistance it gives to the motions of the beater or shaker members.

However, simultaneously with causing bunches of grapes and individual grapes to become detached, the shaker or beater members, when too energetically moved, may damage the vines, at least to some extent, which may be detrimental to the health of the crop. It is therefore generally necessary to find a compromise between the various above-mentioned parameters in order to obtain an acceptable percentage of harvested grapes or bunches of grapes without giving rise to unacceptable damage to the vines.

The foregoing notwithstanding, certain types of grape vines, such as the goblet-shaped vines for example, present a dense vegetation to the shaker or beater members rendering it difficult for said members to obtain a sufficient penetration in case the energetic value of the shaking or beating action would be too low, whereby the percentage of unharvested grapes would be unacceptable. Under such conditions, one of the parameters of importance is the number of the oscillations of the shaker and beater members acting on a given grape vine and therefore increasing the shaking or beating frequency could present a solution to overcome the above drawback.

Also, in case the operating speed and hence the capacity of the harvester is to be increased while still subjecting each grape vine to a given number of oscillations, the shaking or beating frequency again has to be increased.

It is experienced however that, in practice, most shaking or beating members which consist of solid rods made of a flexible material, are normally already operating at a frequency close to the resonance frequency of the rods, implying that any further increase in the operating frequency most likely would result in the rods going into resonance whereby the speed of displacement of said rods as well as the real amplitude of their motion are no longer controlled and no longer correspond to the speed and amplitude of the reciprocating drive mechanism associated with said rods. As a result, when the shaker or beater members start to "race", an uncontrollable deformation of the rods would occur, leading to damage of the vines and ultimately to the rupture of the rods.

SUMMARY OF THE INVENTION

It is therefore the objective of the present invention to provide shaker or beater rods of which the resonance frequency, relative to presently used rods, is increased allowing higher operating frequencies to be used.

According to the present invention, a machine is provided for harvesting fruits, berries and the like, from fruit trees and bushes planted in rows, the machine comprising a straddling chassis capable of moving across a field, a shaker assembly mounted on the chassis and including at least one pair of elongated shaker members which extend generally in the longitudinal direction of the machine and which are spaced transversely from one another and situated respectively on opposite sides of the central fore-and-aft axis of the machine so as to define an active shaking zone, each shaker member being formed by a rod of flexible material, and a control mechanism operatively connected to the rods to drive them synchronously with a reciprocating motion in a direction extending transversely relative to said fore-and-aft axis.

The machine is characterized in that each rod comprises at least one cavity to reduce the weight thereof.

Preferably, the cavity is in the form of a central, cylindrical bore extending in the longitudinal direction of the rod. The rod ends are closed by plug members to prevent any material to accumulate in the bore.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
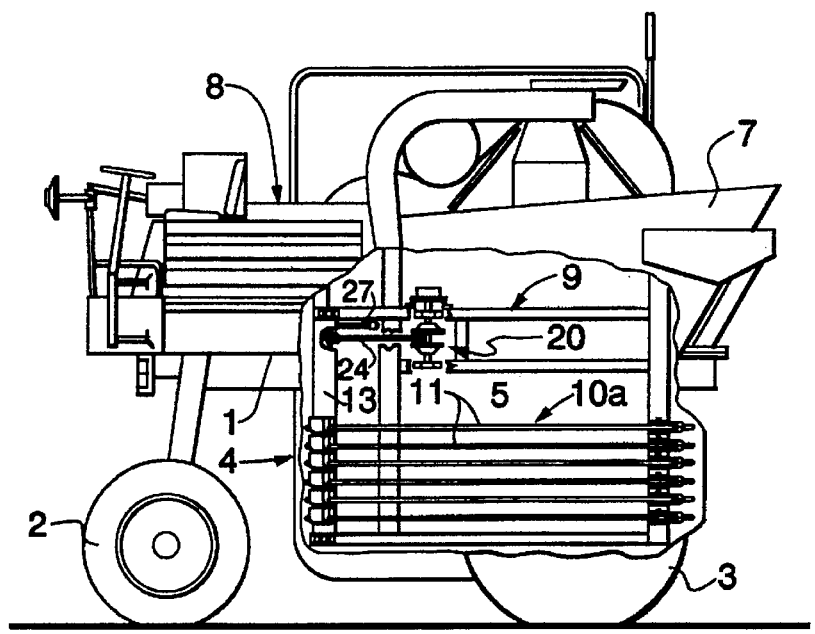
FIG. 1 is a side elevational view, partially broken away, of a harvesting machine fitted with a shaker assembly in accordance with the present invention.
Figure 2:
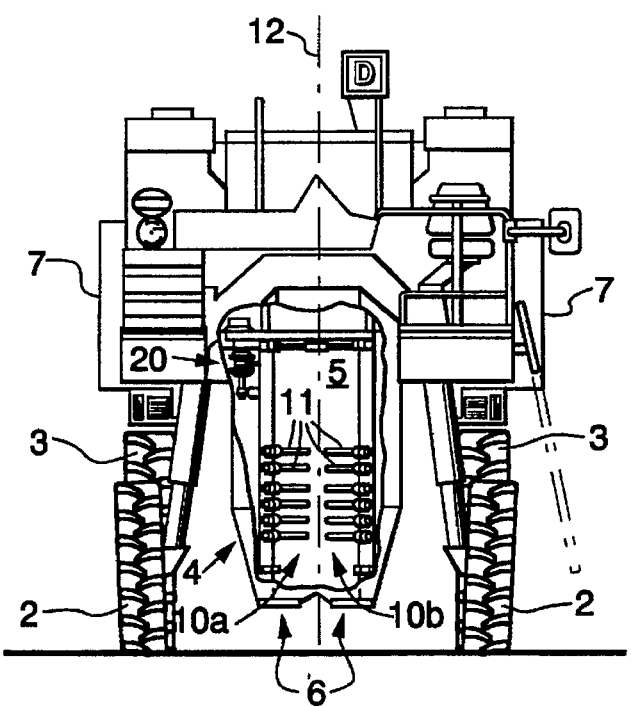
FIG. 2 is a front elevational view, equally partially broken away, of the harvesting machine of FIG. 1.

The harvesting machine shown in FIGS. 1 and 2 is a grape harvester and comprises, in a conventional manner, a chassis 1 provided with front steerable wheels 2 and rear traction wheels 3 for moving the chassis 1 over the ground. The chassis 1 is in the form of a gantry in order to be able to straddle a row of plants. In known manner, the chassis 1 carries a harvesting assembly 4 comprising a shaker assembly 5 and two elevator conveyors 6 for collecting the grapes that have been detached by the shaker assembly 5 in order to convey them to a temporary storage tank 7 (generally two tanks are provided on respective sides of the machine). The chassis also has an engine 8 providing the rotational power necessary to drive the various active members of the machine and also for providing motive power to the wheels in case the machine is of the self-propelled type.

The harvesting assembly 4 may be fixed in a permanent manner to the chassis 1 of the machine or else it may be made in the form of a removable assembly which is detachably fixed to the chassis 1 so as to be capable of being replaced by other equipment or accessories, such as spraying equipment, pruning equipment, equipment for tilling the ground, etc. The harvesting assembly 4 can therefore either be supported directly by the chassis 1 of the machine or else it may be supported by an auxiliary chassis 9. In known manner, the auxiliary chassis 9 may be mounted fixedly relative to the chassis 1 or it may be pivotally mounted thereon with its top portion being pivotally attached to a horizontal, fore-and-aft extending axis for swinging movement therearound.

As can be seen more particularly in FIG. 2, the shaker assembly 5 comprises two sets 10a and 10b of shaker members 11, with the two sets 10a and 10b being disposed facing one another on opposite sides of the longitudinal median plane 12 of the machine. As can be seen more clearly in FIG. 3, each set, e.g. the set 10a, may comprise six shaker members 11, for example, which are vertically spaced one above the other and which extend generally horizontally, even though they may also slope downwardly going from the front towards the rear of the machine. Although the shaker assembly shown in FIGS. 1 to 3 comprise two sets of six shaker members, it is obvious that the number may be decreased or increased depending on types of fruit tree or bush, and for a given type of fruit tree or bush depending on the variety, the way in which it has been trained, and the shape of the vegetation of the fruit trees or bushes. Variations may also depend on whether it is desired to shake the fruit trees or bushes by their trunks or by their vegetation.

Figure 4:
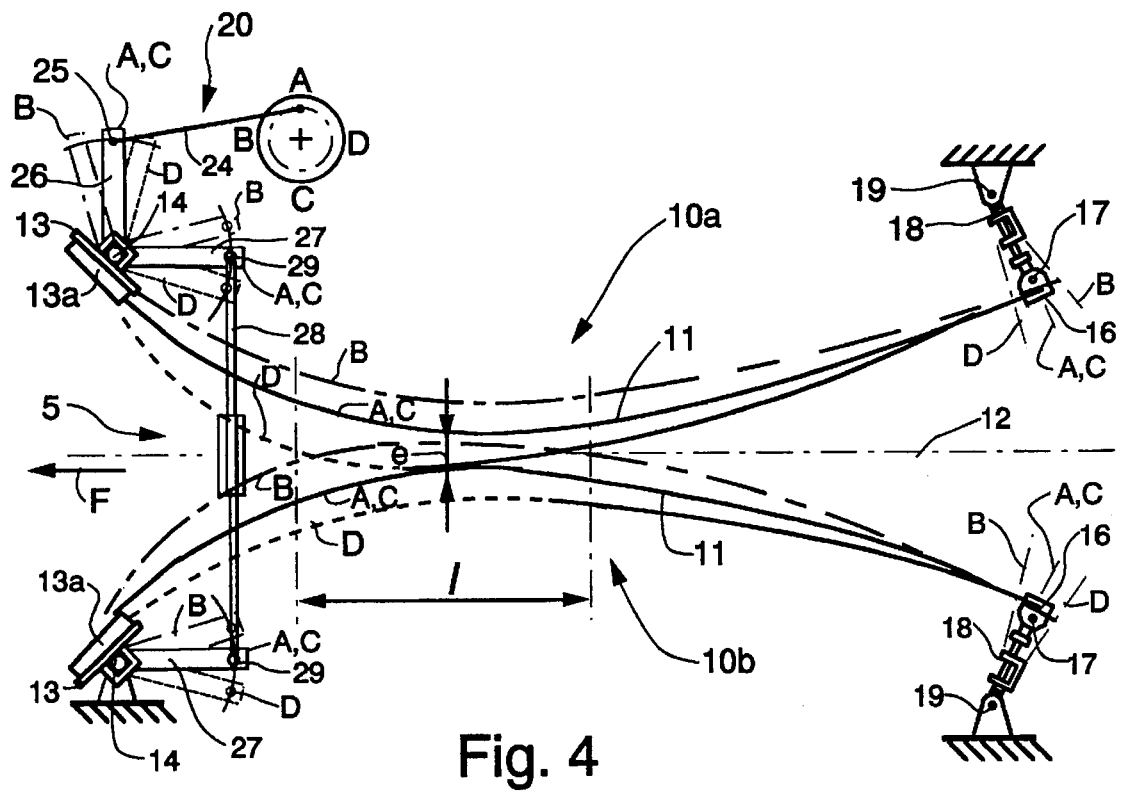
FIG. 4 is a schematic top view showing the shaker assembly of the machine shown in FIGS. 1 and 2.
Figure 5:
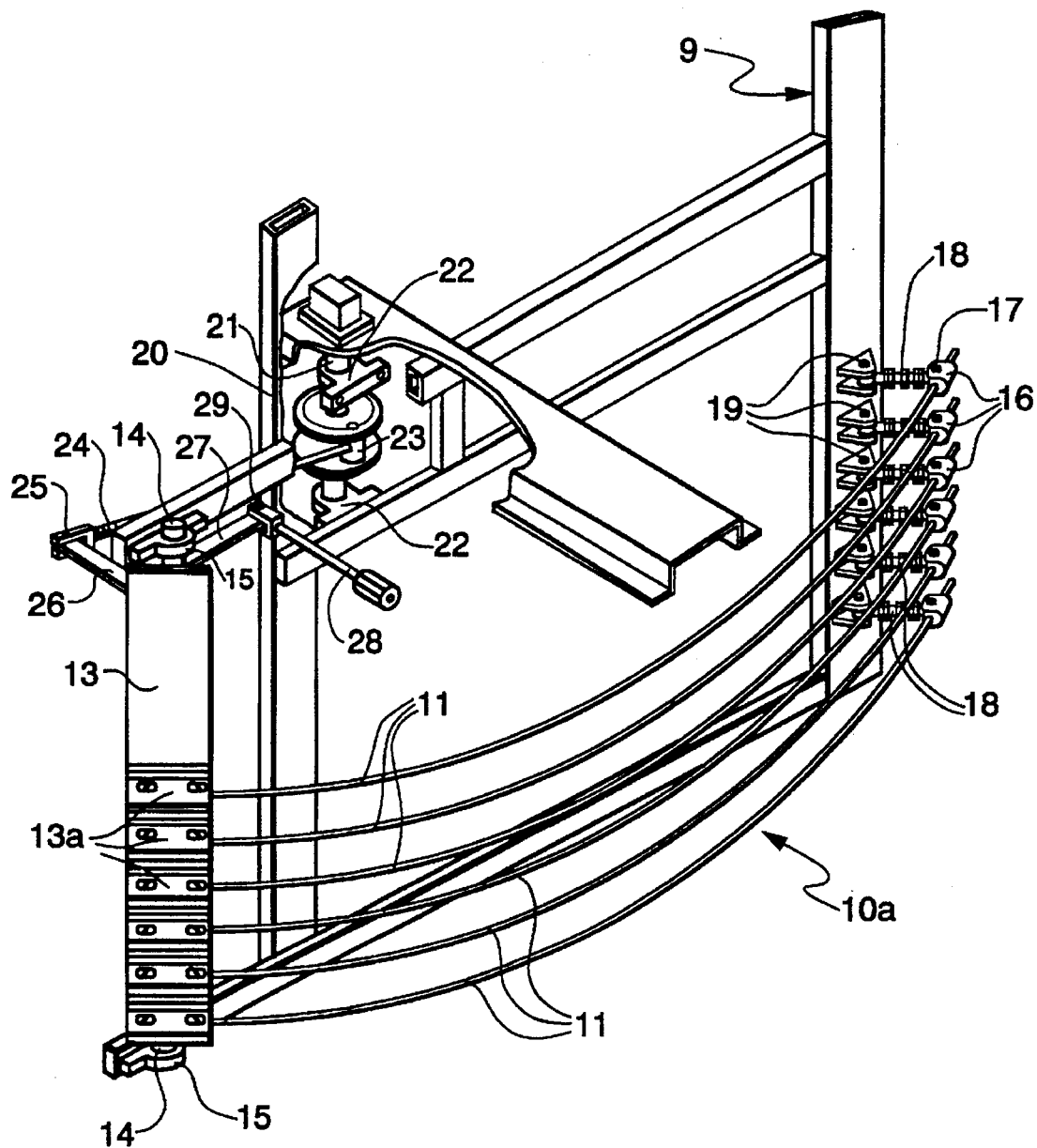
FIG. 5 is a perspective view of the portion of the shaker assembly shown in FIG. 3.

Each shaker member 11 is constituted by a flexible rod whose cross-section is very small compared to its length and as can be seen more particularly in FIGS. 4 and 5, each rod 11 is curved to form an arc. The rods used may be pre-curved on manufacture but preferably they are rectilinear, in which case they are curved by bending when mounted on the shaking assembly 5.

Figure 3:
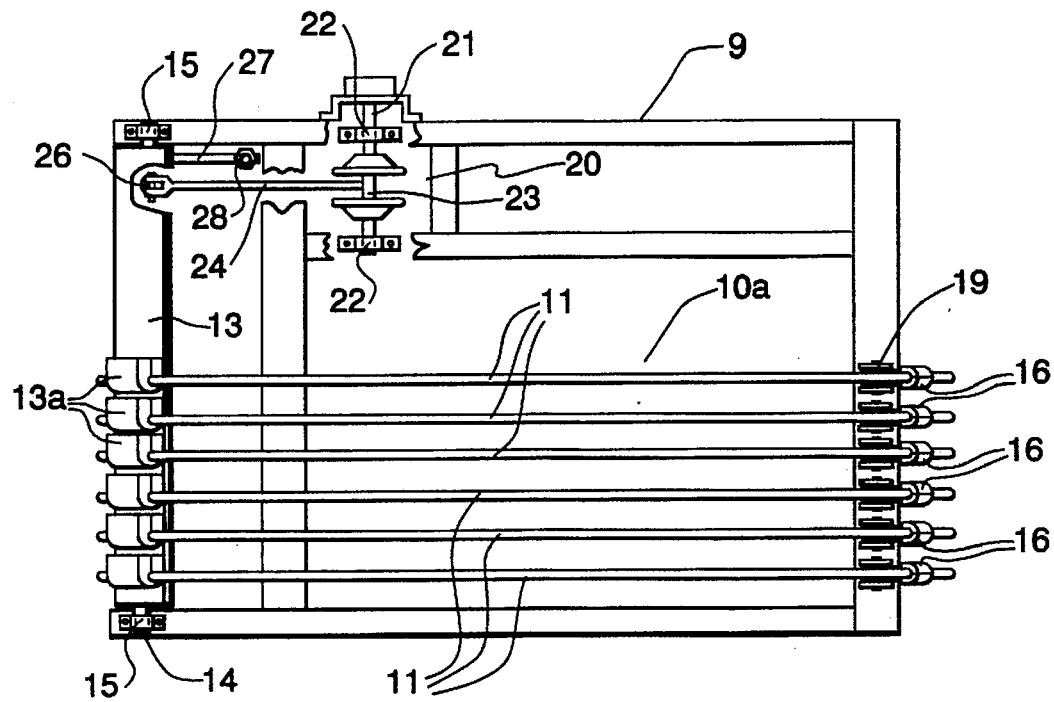
FIG. 3 is a side elevational view on a larger scale showing a portion of the shaker assembly of the machine shown in FIGS. 1 and 2.

With particular reference to FIGS. 3 to 5, one of the ends of each rod 11 is firmly clamped in a clamp 13a which is rigidly fixed to a vertical support plate 13 (with one plate 13 being provided for each of the two sets 10a and 10b of rods 11). Each plate 13 is provided at each of its ends with a vertically oriented stub axle 14 rotatably received in a bearing 15 fixed on the auxiliary chassis 9. The other end of each rod 11 is fixed in a support 16 which is hinged about a vertical axis 17 at one of the ends of a short link 18 whose other end is hinged to the auxiliary chassis 9 about a vertical axis 19.

A drive device 20 producing a reciprocating motion is connected to the support plate 13 on one of the two sets 10a and 10b of rods 11 in order to cause the plate 13 to oscillate about the axis of the stub axles 14. The drive device 20 may be constituted, for example, by a connecting rod and crank system whose shaft 21 is rotatable in bearings 22 (as seen in FIGS. 3 and 5) which are fixed to the auxiliary chassis 9. The shaft 21 may be rotated by any appropriate transmission (not shown) connected to the output shaft of a motor, for example the motor 8 of the harvesting machine. One of the ends of the connecting rod 24 is hinged to a crank pin 23 of the connecting rod and crank pin system 20 while its opposite end is hinged about an axis 25 to a horizontal arm 26 which is rigidly fixed to the support plate 13 for the set 10a of rods 11. Two other horizontal arms 27 extend substantially parallel to the longitudinal median plane 12 of the machine and are rigidly fixed to respective ones of the two vertical plates 13. The arms 27 are interconnected by a horizontal and transverse coupling rod 28 which ends are hinged to respective ones of the free ends of the arms 27 about axes 29. Preferably, the coupling rod 28 is in the form of a rod of which the length is adjustable, such as by a turnbuckle as shown in FIG. 4, in order to enable the symmetrical adjustment of the two sets 10a and 10b of the rods 11 relative to the median plane 12 of the machine.

In the following description, it is assumed that the harvesting machine advances in the direction indicated by arrow F in FIG. 4. Under such conditions, the support plates 13 are at the front ends of the rods 11, whereas the supports 16 and the links 18 are at the rear ends of the rods 11, even though the opposite configuration could equally well be used. Under these conditions, going from the front to the rear of the machine, the arcuate shape of the flexible rods 11 in the two sets 10a and 10b, form, between said sets, a converging inlet zone for fruit trees and bushes, followed by an active shaking zone extending over a length 1 as approximately indicated in FIG. 4, which in turn is followed by a diverging outlet zone for the fruit trees or bushes.

In FIG. 4, letters A, B, C and D indicate the positions taken up by the various components of the shaker assembly for four different angular positions A, B, C and D of the connecting rod and crank drive system 20. From FIG. 4, it is clear that during rotation of the crank pin 23 about the axis of the shaft 21, the curvature of the flexible rods 11 varies cyclically about an average value of curvature which corresponds to positions A and C and which lies between a minimum curvature and a maximum curvature. It can also be seen that the flexible rods 11 of the set 10a are at minimum curvature when the flexible rods 11 of the set 10b are at maximum curvature (position B), and conversely that the rods 11 of the set 10a are at maximum curvature when the rods 11 of the set 10b are at minimum curvature (position D). It can also be seen that while the rods 11 are bending from their minimum curvature position towards their maximum curvature position, their front and rear ends remain at a substantially constant distance from the longitudinal median plane 12, whereas the active shaking zone 1 reciprocates transversely on either side of said longitudinal plane 12. The amplitude of the transverse movement of the active portion of the flexible rods 11 depend on their maximum and minimum values of curvature which in turn depend on the eccentricity of the crank pin 23 relative to the axis of the shaft 21. Preferably, the eccentricity of the crank pin 23 is adjustable in known manner in order to make it possible to adjust the amplitude of the transverse motion of the active portion of the flexible rods 11. Preferably, the connecting rod 24 is also provided in the form of a rod of variable length in order to make it possible to adjust the average position (positions A, C) of the rods 11 so that the distance e between the active portions of the rods in the two sets 10a and 10b respectively can be adjusted.

Figure 6:
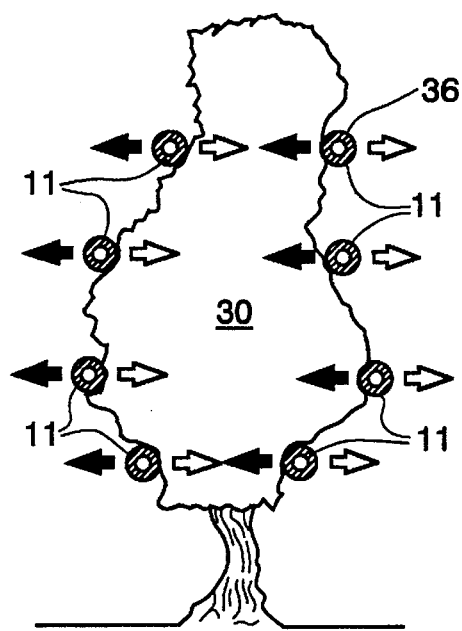
FIG. 6 shows how the flexible rods of the shaker assembly act on a fruit tree or bush, for example on a vine plant.

FIG. 6 shows how the flexible rods 11 of the shaker assembly of a harvesting machine in accordance with the present invention are capable of adapting individually to the thickness of the vegetation 30 on a fruit tree or bush such as a vine plant. This may be explained in the following manner. When a vine plant arrives in the converging inlet portion between the two sets 10a and 10b of rods 11, the vegetation applies forces to the rods 11 such that the longitudinal components thereof are transmitted by said rods to the links 18 which pivot rearwardly about their axes 19. Simultaneously, by virtue of their high degree of flexibility, the rods 11 deform elastically (their curvature decreases) and move further and further away from the longitudinal median plane 12 depending on the thickness of the vegetation at the height of each rod 11. Conversely, during shaking in the active shaking zone, the transverse forces applied to the rods 11 which are due to the resistance put up by the vegetation against said rods 11 have a reduced tendency to pivot the links 18 rearwardly about their axes 19 because the links 18 extend roughly transversely relative to the longitudinal median plane 12 and are substantially perpendicular to the rear ends of the rods 11. Consequently, during shaking, the rods 11 deform relatively little by bending and the amplitude of their motion is practically fully transmitted to the vegetation.

Each shaker member 11 is made of a material which is very flexible and deformable, for example a polyamide or a glass fibre reinforced polyester. In the arrangement shown, good results have been obtained on vines when using solid rods having a circular section with a diameter in the range of 25 to 30 mm and a length of approximately 2 m made of a polyamide 66 type of which the modulus of elasticity E is equal to approximately 3000 N/mm². With such a configuration, a maximum operating frequency of about 7.2 Hz (i.e. approximately 430 RPM) is obtainable, which is already close to the resonance frequency of a shaker member 11, as such preventing the frequency of the drive mechanism 20 to be increased above 7.2 Hz in cases where really needed, such as when harvesting under conditions where the grapes or bunches of grapes are difficult to detach from the vines.

In practice, certain types of shaker mechanisms, having semi loop-shaped rods (not shown) for example, already may operate at higher frequencies without going into resonance, which is due to the fact that these rods normally are rather short. It will be appreciated however that as a result thereof, the active shaking zone of such rods is reduced in length, meaning that, for a given driving speed, the operating frequency should be higher in order to obtain a sufficient number of oscillations transmitted to a given bunch of grapes. Increasing the operating frequency any further for increasing the operating efficiency under special harvesting conditions again would be impossible since the rods would go into resonance.

Figure 7:
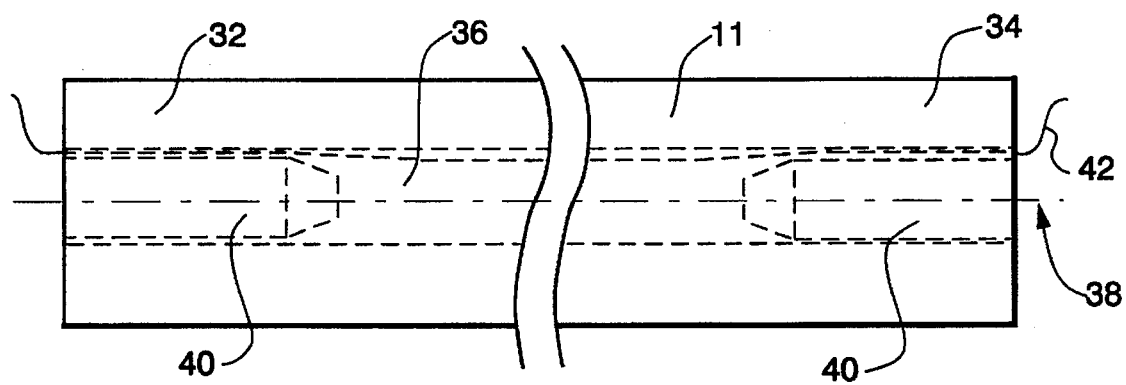
FIG. 7 is a side elevational view of a shaker rod in accordance with the present invention.

With specific reference to FIG. 7, an individual rod 11 is shown having a rectilinear shape being the shape before it is mounted on the shaking assembly 5. The rod 11 comprises a front end 32 for being clamped by a clamp 13a and a rear end 34 for attachment to a support 16. In accordance with the present invention, the mass, and therefore the weight, of each rod 11 is decreased by providing a central cavity therein, preferably in the form of a cylindrical bore 36, indicated in FIGS. 6 and 7, extending longitudinally along the full length of the rod 11. The diameter of the bore is in the range of 10 to 20 mm and the bore is provided to reduce the amount of rod material around the central, longitudinal axis 38 of the rod 11 considering that said material only adds up to the weight of the rod 11 without having any considerable influence on the increase of the rigidity thereof. Reducing the mass of rod material, especially in the region close to the central axis 38, presents an important step in increasing the resonance frequency of the rod 11. In addition, the outer diameter of the rod 11 is slightly increased when compared to a rod with a solid section to a value inbetween 30 and 35 mm in order to render the rod 11 more rigid, thereby again having a positive effect on the resonance frequency thereof. As the increase in diameter is only minor, no adverse effects on the operating efficiency of the rod 11 are to be feared. As a result of these modifications, the working frequency of the rod 11 may be increased to more than 8.8 Hz (approximately 530 RPM) without going into resonance.

At each end of the rod 11, a plug member 40 is inserted into the bore 36 on the one hand to prevent foreign material such as dust, grape juice, etc to enter and accumulate into the bore 36 whereby the positive effect of the bore 36 on the resonance frequency would be impaired and on the other hand to reinforce the ends 32 and 34 for avoiding deformation and crushing of said ends when being clamped onto their respective supports 13, 16. The plug members 40 may be glued into the bore 36 or fastened in any other convenient manner. Preferably, the plug members 40 are made of material similar to the material of the rods 11.

Although with the present arrangement the resonance frequency of the rods 11 has been increased, it nevertheless may occur that a rod 11 inadvertently is ruptured during operation, caused e.g. by the shaking mechanism 5 hitting a solid object located too far out of line with the vines. In case no immediate action is taken to neutralize the drive of the shaking mechanism, a ruptured rod may cause serious damage, not only to the vines, but also to the other rods, which in turn may become ruptured. Since it is a common practice to equip present day grape harvesters with an operator's cab shielding the operator from the environment and hence also from external sounds, it is foreseeable that a ruptured rod will not immediately be noticed by the operator. To prevent this from happening, a thin electrical wire 42, to which a low voltage is applied, may be run through the bore 36 in each rod 11, all these wires 42 being operatively connected together and linked to a warning or control system (not shown) in the operator's cab. The wires 42 are installed into the bores 36 with some play allowing the rods 11 to flex as desired without imparting any damage to the wires 42. As long as all wires are intact, no warning or control signal is generated. However, it will be appreciated that upon rupture of a rod 11, the associated wire 42 also will be snapped, whereby the operator receives an audible or visual alarm signal in his cab enabling him to take immediate action or a control signal may be generated whereby the drive to the shaking mechanism is immediately disengaged.

It will be appreciated that the bore 36 should not necessarily extend along the full length of the rod 11, but may stop short of the opposite ends of the rod 11 whereby the plug members 40 are no longer needed. In still other embodiments, the rod 11 may comprise several individual, spherical or oblong cavities, all aiming to reduce the weight of the rod. Considering that, as best seen in FIG. 4, the rods 11 are always curved and pretensioned in a given direction, the bore 36 or individual cavities may be provided eccentrically of the central axis 38, preferably offset in the direction of the inward curve or concave side of the rod 11 since the rod material at this location has the least influence on the rigidity of the rod 11. In extremis, the bore 36 may have an irregular cross-sectional shape and may even pierce through the longitudinal side of the rod 11, whereby the bore no longer would be provided fully internally of the rod 11. Still further, instead of rods with a circular cross section, also oval shaped, hollow rods may be employed. A prerequisite of all the above embodiments is to provide the bores or cavities in a region of the rods having only little influence on the rigidity thereof in such a manner that the ratio of the rigidity reduction versus weight reduction is increased leading to higher resonance frequencies.

Although the present invention has been described with reference to a shaking mechanism 5 in which the front ends 32 of the shaker rods 11 are fixedly attached to an oscillating drive mechanism 13 while the rear ends 34 are pivotally connected to a link mechanism 18, it will be clear that the invention is applicable to all kinds of shaker or beater mechanisms employing flexible rods. As an example, the rods may be attached at one end only while the opposite end is free to move and constitutes the active portion of the rod.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. A machine for harvesting fruits, berries and the like, from fruit trees and bushes planted in rows, the machine comprising:

a straddling chassis (1) capable of moving across a field;

a shaker assembly (5), mounted on the chassis (1) and including at least one pair (10a, 10b) of elongated shaker members (11) which extend generally in the longitudinal direction of the machine and which are spaced transversely from one another and situated respectively on opposite sides of the central fore-and-aft axis (12) of the machine so as to define an active shaking zone (1), each shaker member being formed by a rod (11) of single continuous flexible material; and a control mechanism (20) operatively connected to the rods (11) to drive them synchronously with a reciprocating motion in a direction extending transversely relative to said fore-and-aft axis (12); and characterized in that each rod (11) has at least one cavity (36) throughout a substantial portion thereof to reduce the weight of such rod.

2. A machine according to claim 1 characterized in that the at least one cavity (36) is provided internally of the rod (11).

3. A machine according to claim 1 characterized in that the at least one cavity (36) takes the form of a cylindrical bore (36) extending in the longitudinal direction of the rod (11).

4. A machine according to claim 3 characterized in that the bore (36) is provided coaxially with the longitudinal axis (38) of the rod (11).

5. A machine according to claims 3 characterized in that the bore (36) extends the full length of the rod (11).

6. A machine according to claim 5 characterized in that the opposite ends (32, 34) of the rod (11) are closed by plug members (40).

7. A machine according to claim 3 characterized in that conductive wire means (42) are provided in the bore (36); said wire means (42) being connected to a warning system or a control system in a manner such that, upon rupture of a rod (11) and the associated wire means (42), the operator is warned and/or the drive to the shaker assembly (5) is automatically disengaged.

8. A machine according to claim 1 characterized in that each flexible rod (11) has one of its ends articulated to a fixed point (14) on the chassis (1) and its opposite end attached to a point (17) which can move in a direction substantially parallel to the central fore-and-aft axis (12) of the machine.

9. A machine according to claim 1 characterized in that each flexible rod (11) has one of its ends articulated to a fixed point (14) on the chassis (1) while its opposite end is free to move in a direction substantially perpendicular to the central fore-and-aft axis (12) of the machine.

* * * * *